United States Patent
Bledsoe et al.

(10) Patent No.: US 8,351,062 B2
(45) Date of Patent: Jan. 8, 2013

(54) BIT SELECTION FROM PRINT IMAGE IN MEMORY OF HANDHELD IMAGE TRANSLATION DEVICE

(75) Inventors: James D. Bledsoe, Corvallis, OR (US); Todd A. McClelland, Corvallis, OR (US); Gregory F. Carlson, Corvallis, OR (US); Asher Simmons, Corvallis, OR (US)

(73) Assignee: Marvell World Trade Ltd., St. Michael (BB)

( * ) Notice: Subject to any disclaimer, the term of this patent is extended or adjusted under 35 U.S.C. 154(b) by 887 days.

(21) Appl. No.: 12/037,043

(22) Filed: Feb. 25, 2008

(65) Prior Publication Data

US 2008/0204770 A1    Aug. 28, 2008

Related U.S. Application Data

(60) Provisional application No. 60/891,633, filed on Feb. 26, 2007.

(51) Int. Cl.
- G06F 3/12 (2006.01)
- G06K 15/00 (2006.01)
- H04N 1/024 (2006.01)
- H04N 1/46 (2006.01)
- B41J 2/15 (2006.01)
- B41J 3/36 (2006.01)
- B41J 2/47 (2006.01)

(52) U.S. Cl. ...... 358/1.15; 358/1.16; 358/473; 358/502; 347/40; 347/109; 347/237

(58) Field of Classification Search ........... 358/1.15, 358/1.16, 1.8, 296, 444, 502, 503, 524, 473, 358/493, 494; 400/120.05, 124.08, 124.09, 400/124.11, 120.02, 88, 76, 1; 347/41, 14, 347/237, 12, 43, 17, 40, 172, 181, 173, 232, 347/233, 108, 109

See application file for complete search history.

(56) References Cited

U.S. PATENT DOCUMENTS

| | | | | |
|---|---|---|---|---|
| 4,963,882 A | * | 10/1990 | Hickman | 347/41 |
| 4,967,203 A | * | 10/1990 | Doan et al. | 347/41 |
| 5,278,582 A | * | 1/1994 | Hongo | 347/14 |
| 5,387,976 A | | 2/1995 | Lesniak | |
| 5,461,680 A | | 10/1995 | Davis | |
| 5,578,813 A | | 11/1996 | Allen et al. | |
| 5,634,730 A | * | 6/1997 | Bobry | 400/88 |
| 5,748,785 A | * | 5/1998 | Mantell et al. | 382/237 |
| 5,751,470 A | * | 5/1998 | Damon | 358/3.23 |
| 5,832,122 A | * | 11/1998 | Shimazaki | 382/237 |

(Continued)

FOREIGN PATENT DOCUMENTS

AU    2006252324 B1    1/2007

(Continued)

OTHER PUBLICATIONS

U.S. Appl. No. 12/188,056, filed Aug. 7, 2008, Mealy et al.

(Continued)

*Primary Examiner* — Benny Q Tieu
*Assistant Examiner* — Ngon Nguyen

(57) ABSTRACT

Systems, apparatuses, and methods for selecting bits from a defined print image in memory of a handheld imaging translation device are described herein. The bits may be selected by determining a location of a print nozzle, mapping the location to a memory location, and selecting a bit from the memory location. Other embodiments may be described and claimed.

6 Claims, 7 Drawing Sheets

U.S. PATENT DOCUMENTS

| | | | |
|---|---|---|---|
| 5,898,393 A * | 4/1999 | Werner | 341/55 |
| 5,927,872 A | 7/1999 | Yamada | |
| 5,930,466 A | 7/1999 | Rademacher | |
| 5,988,900 A * | 11/1999 | Bobry | 400/88 |
| 6,325,487 B1 * | 12/2001 | Mantell | 347/41 |
| 6,339,480 B1 * | 1/2002 | Yamada et al. | 358/1.8 |
| 6,348,978 B1 | 2/2002 | Blumer et al. | |
| 6,384,921 B1 | 5/2002 | Saijo et al. | |
| 7,083,255 B2 * | 8/2006 | Shibata et al. | 347/40 |
| 7,200,560 B2 | 4/2007 | Philbert | |
| 7,297,912 B1 | 11/2007 | Todoroff et al. | |
| 7,410,100 B2 | 8/2008 | Muramatsu | |
| 7,607,749 B2 | 10/2009 | Tabata et al. | |
| 7,677,693 B2 * | 3/2010 | Jeon et al. | 347/41 |
| 7,929,019 B2 | 4/2011 | Ohmura et al. | |
| 7,949,370 B1 | 5/2011 | Bledsoe et al. | |
| 7,988,251 B2 | 8/2011 | Dimitrijevic et al. | |
| 2002/0154186 A1 | 10/2002 | Matsumoto | |
| 2002/0158955 A1 | 10/2002 | Hess et al. | |
| 2003/0043388 A1 | 3/2003 | Andrews et al. | |
| 2003/0098897 A1 | 5/2003 | Hoshino et al. | |
| 2003/0150917 A1 | 8/2003 | Tsikos et al. | |
| 2004/0021912 A1 | 2/2004 | Tecu et al. | |
| 2004/0109034 A1 | 6/2004 | Brouhon | |
| 2004/0208346 A1 | 10/2004 | Baharav et al. | |
| 2005/0001867 A1 | 1/2005 | Akase | |
| 2005/0206921 A1 | 9/2005 | Aruga et al. | |
| 2006/0012660 A1 * | 1/2006 | Dagborn | 347/109 |
| 2006/0061647 A1 | 3/2006 | Breton | |
| 2006/0221403 A1 | 10/2006 | Bancel | |
| 2006/0279784 A1 | 12/2006 | Carlson et al. | |
| 2007/0150194 A1 | 6/2007 | Chirikov | |
| 2008/0007762 A1 | 1/2008 | Robertson et al. | |
| 2008/0144053 A1 | 6/2008 | Gudan et al. | |
| 2008/0212120 A1 | 9/2008 | Mealy et al. | |
| 2009/0034018 A1 | 2/2009 | Lapstun et al. | |
| 2009/0279148 A1 | 11/2009 | Lapstun et al. | |
| 2010/0039669 A1 | 2/2010 | Chang et al. | |
| 2010/0231633 A1 | 9/2010 | Lapstun et al. | |

FOREIGN PATENT DOCUMENTS

| | | |
|---|---|---|
| EP | 0655706 A1 | 5/1995 |
| EP | 1209574 A2 | 5/2002 |
| JP | 7152505 A | 6/1995 |
| JP | 11301036 | 11/1999 |
| JP | 2002307756 A | 10/2002 |
| JP | 2003159817 A | 6/2003 |
| JP | 2005271387 A | 10/2005 |
| JP | 2006145665 | 6/2006 |
| JP | 2006527355 | 11/2006 |
| JP | 2006341604 A | 12/2006 |
| WO | WO 03/076196 A1 | 9/2003 |
| WO | WO2004088576 | 10/2004 |

OTHER PUBLICATIONS

U.S. Appl. No. 11/955,209, filed Dec. 12, 2007, Bledsoe et al.
U.S. Appl. No. 11/955,228, filed Dec. 12, 2007, Bledsoe et al.
U.S. Appl. No. 11/955,240, filed Dec. 12, 2007, Bledsoe et al.
U.S. Appl. No. 11/955,258, filed Dec. 12, 2007, Simmons et al.
U.S. Appl. No. 11/959,027, filed Dec. 18, 2007, Simmons et al.
U.S. Appl. No. 11/968,258, filed Jan. 2, 2008, Simmons et al.
U.S. Appl. No. 11/972,462, filed Jan. 10, 2008, Simmons et al.
U.S. Appl. No. 12/013,313, filed Jan. 11, 2008, Bledsoe et al.
U.S. Appl. No. 12/016,833, filed Jan. 18, 2008, Simmons et al.
U.S. Appl. No. 12/036,996, filed Feb. 2, 2008, Bledsoe et al.
U.S. Appl. No. 12/037,029, filed Feb. 25, 2008, Bledsoe et al.
U.S. Appl. No. 12/038,660, filed Feb. 2, 2008, McKinley et al.
U.S. Appl. No. 12/041,496, filed Mar. 8, 2008, Mealy et al.
U.S. Appl. No. 12/041,515, filed Mar. 3, 2008, Mealy et al.
U.S. Appl. No. 12/041,535, filed Mar. 3, 2008, Mealy et al.
U.S. Appl. No. 12/062,472, filed Apr. 3, 2008, McKinley et al.
Fairchild, "IEEE 1284 Interface Design Solutions", Jul. 1999, Fairchild Semiconductor, AN-5010, 10 pages.
Texas Instruments, "Program and Data Memory Controller", Sep. 2004, SPRU577A, 115 pages.
Drzymala et al., "A Feasibilty Study Using a Stereo-optical Camera System to Verify Gamma Knife Treatment Specifications", Proceedings of the 22nd annual EMBS International Conference, Jul. 23-28, 2000, Chicago, IL, 4 pages.
Liu, "Determiantion of the Point of Fixation in a Head-Fixed Coordinate System", 1998 Proceedings. Fourteenth International Conference on Pattern Recognition; vol. 1; Digital Object Identifier, Aug. 1998, 4 pages.

* cited by examiner

BIT SELECTION FROM PRINT IMAGE IN MEMORY OF HANDHELD IMAGE TRANSLATION DEVICE

CROSS REFERENCE TO RELATED APPLICATIONS

The present application is a non-provisional application of provisional application 60/891,633, filed on Feb. 26, 2007, and claims priority to said provisional application. The specification of said provisional application is hereby incorporated in its entirety, except for those sections, if any, that are inconsistent with this specification.

TECHNICAL FIELD

Embodiments of the present invention relate to the field of printing, and, in particular, to bit selection from a print image in memory of handheld image translation devices.

BACKGROUND

Traditional printing devices rely on a mechanically operated carriage to transport a print head in a linear direction as other mechanics advance a print medium in an orthogonal direction. As the print head moves over the print medium, an image may be laid down. This systematic, translational movement of the print head allows the image to be defined in memory as horizontal page-width print swaths. Such a memory organization is optimal for a deterministic operational environment where the future location of the print head is known well in advance. Further, such an environment allows for the sequential access of memory, thereby negating the need for recursive and computationally expensive memory address calculations.

While this memory allocation scheme may work well with traditional printers, non-deterministic or random motion of handheld image translation devices discourages a sequential and interleaved image definition in memory. For example, such an image definition utilized in a handheld image translation device would require a determination of the absolute position of the image translation device and the specific image characteristics associated with that position to be located and accessed in memory for every print pulse. These memory calculations, while computationally expensive, may also impact the printed image. Failure to select and print the image defined in memory prior to a change in location may result in poor image quality or no image at all.

SUMMARY

At least some embodiments disclose an image translation device selecting bits from a defined print image in memory. In particular, and in accordance with some embodiments, a method is disclosed comprising: determining a location of a first nozzle of an image translation device relative to a reference location, the first nozzle being configured to deposit a printing substance of a first color; mapping the location to a first memory location within a first plurality of memory locations that have a respective first plurality of bits representing a first color plane of a print image, the first color plane corresponding to the first color; selecting a first bit from the first memory location; and controlling the first nozzle to deposit the printing substance based at least in part on the selected first bit.

In some embodiments, the method may further include determining a location of a second nozzle of the image translation device relative to the reference location, the second nozzle configured to deposit a printing substance of a second color; mapping the location of the second nozzle to a second memory location within a second plurality of memory locations that have a respective second plurality of bits representing a second color plane of the print image, the second color plane corresponding to the second color; selecting a second bit from the second memory location; and controlling the second nozzle to deposit the printing substance of the second color based at least in part on the selected second bit. The selected second bit may be associated with the selected first bit.

In some embodiments, the method may further include determining an association between the selected first bit and a selected second bit in a second memory location within a second plurality of memory locations that have a respective second plurality of bits representing a second color plane of the print image, the second color plane corresponding to the second color; and controlling the second nozzle to deposit the printing substance of the second color based at least in part on selected second bit.

In some embodiments, the method may further include determining a location of a nozzle row of the image translation device relative to the reference location, the nozzle row having a plurality of nozzles, including the first nozzle, configured to deposit the printing substance of the first color; mapping the location of the nozzle row to two or more memory locations within the first plurality of memory locations, the two or more memory locations including the first memory location; and selecting two or more bits, including the first bit, from the two or more memory locations. The mapping of the location of the nozzle row to two or more memory locations may include generating a memory overlay based at least in part on dimensions of the nozzle row; mapping the memory overlay to the first plurality of memory locations based at least in part on the determined location of the nozzle row; and determining that each of the two or more memory locations overlap the memory overlay greater than a threshold value.

In other embodiments, a machine-accessible medium having associated instructions, which, when accessed, results in a machine: determining a location of a first nozzle of an image translation device relative to a reference location, the first nozzle being configured to deposit a printing substance of a first color; mapping the location to a first memory location within a first plurality of memory locations that have a respective first plurality of bits representing a first color plane of a print image, the first color plane corresponding to the first color; selecting a first bit from the first memory location; and controlling the first nozzle to deposit the printing substance based at least in part on the selected first bit.

In some embodiments, the associated instructions, when accessed, further results in the machine: determining a location of a second nozzle of the image translation device relative to the reference location, the second nozzle configured to deposit a printing substance of a second color; mapping the location of the second nozzle to a second memory location within a second plurality of memory locations that have a respective second plurality of bits representing a second color plane of the print image, the second color plane corresponding to the second color; selecting a second bit from the second memory location; and controlling the second nozzle to deposit the printing substance of the second color based at least in part on selected second bit.

In some embodiments, the associated instructions, when accessed, further results in the machine: determining an association between the selected first bit and a selected second bit in a second memory location within a second plurality of memory locations that have a respective second plurality of bits representing a second color plane of the print image, the second color plane corresponding to the second color; and controlling the second nozzle to deposit the printing substance of the second color based at least in part on selected second bit.

In some embodiments, the associated instructions, when accessed, further results in the machine: determining a location of a nozzle row of the image translation device relative to the reference location, the nozzle row having a plurality of nozzles, including the first nozzle, configured to deposit the printing substance of the first color; mapping the location of the nozzle row to two or more memory locations within the first plurality of memory locations, the two or more memory locations including the first memory location; and selecting two or more bits, including the first bit, from the two or more memory locations.

In other embodiments, an image translation device may include memory having a first plurality of memory locations with a respective first plurality of bits representing a first color plane of a print image, the first color plane corresponding to the first color; a position module configured to determine a location of a first nozzle of an image translation device relative to a reference location, the first nozzle being configured to deposit a printing substance of a first color; a print module configured to map the location to a first memory location within the first plurality of memory locations, to select a first bit from the first memory location, and to control the first nozzle to deposit the printing substance based at least in part on the selected first bit.

In some embodiments, the position module may be further configured to determine a location of a second nozzle of the image translation device relative to the reference location, the second nozzle configured to deposit a printing substance of a second color; and the print module may be further configured to map the location of the second nozzle to a second memory location within a second plurality of memory locations that have a respective second plurality of bits representing a second color plane of the print image, the second color plane corresponding to the second color; to select a second bit from the second memory location; and to control the second nozzle to deposit the printing substance of the second color based at least in part on selected second bit. The first memory location may be associated with the second memory location.

In some embodiments, the first plurality of memory locations may be consecutive memory locations.

In other embodiments, an image translation device may include a means for determining a location of a first nozzle of an image translation device relative to a reference location, the first nozzle being configured to deposit a printing substance of a first color; means for mapping the location to a first memory location within a first plurality of memory locations that have a respective first plurality of bits representing a first color plane of a print image, the first color plane corresponding to the first color; means for selecting a first bit from the first memory location; and means for controlling the first nozzle to deposit the printing substance based at least in part on the selected first bit.

In some embodiments, the device may include means for determining a location of a second nozzle of the image translation device relative to the reference location, the second nozzle configured to deposit a printing substance of a second color; means for mapping the location of the second nozzle to a second memory location within a second plurality of memory locations that have a respective second plurality of bits representing a second color plane of the print image, the second color plane corresponding to the second color; means for selecting a second bit from the second memory location; and means for controlling the second nozzle to deposit the printing substance of the second color based at least in part on selected second bit. The selected second bit may be associated with the selected first bit.

In some embodiments, the device may include means for determining an association between the selected first bit and a selected second bit in a second memory location within a second plurality of memory locations that have a respective second plurality of bits representing a second color plane of the print image, the second color plane corresponding to the second color; and means for controlling the second nozzle to deposit the printing substance of the second color based at least in part on selected second bit.

In some embodiments, the device may include means for determining a location of a nozzle row of the image translation device relative to the reference location, the nozzle row having a plurality of nozzles, including the first nozzle, configured to deposit the printing substance of the first color; means for mapping the location of the nozzle row to two or more memory locations within the first plurality of memory locations, the two or more memory locations including the first memory location; and means for selecting two or more bits, including the first bit, from the two or more memory locations. The means for mapping the location of the nozzle row to two or more memory locations may include: means for generating a memory overlay based at least in part on dimensions of the nozzle row; means for mapping the memory overlay to the first plurality of memory locations based at least in part on the determined location of the nozzle row; and means for determining that each of the two or more memory locations overlap the memory overlay greater than a threshold value.

BRIEF DESCRIPTION OF THE DRAWINGS

Embodiments of the present invention will be readily understood by the following detailed description in conjunction with the accompanying drawings. Embodiments of the invention are illustrated by way of example and not by way of limitation in the figures of the accompanying drawings.

DETAILED DESCRIPTION

In the following detailed description, reference is made to the accompanying drawings which form a part hereof wherein like numerals designate like parts throughout, and in which are shown, by way of illustration, specific embodiments in which the invention may be practiced. It is to be understood that other embodiments may be utilized and structural or logical changes may be made without departing from the scope of the present invention. Therefore, the following detailed description is not to be taken in a limiting sense, and the scope of the present invention is defined by the appended claims and their equivalents.

The description may use perspective-based descriptions such as up/down, back/front, and top/bottom. Such descriptions are merely used to facilitate the discussion and are not intended to restrict the application of embodiments of the present invention.

Reference in the specification to "one embodiment" or "an embodiment" means that a particular feature, structure, or characteristic described in connection with the embodiment is included in at least one embodiment. The appearances of the phrase "in one embodiment" in various places in the specification do not necessarily all refer to the same embodiment, but they may.

The phrase "A and/or B" means (A), (B), or (A and B). The phrase "A, B, and/or C" means (A), (B), (C), (A and B), (A and C), (B and C) or (A, B and C). The phrase "(A) B" means (A B) or (B), that is, A is optional.

Figure 1:
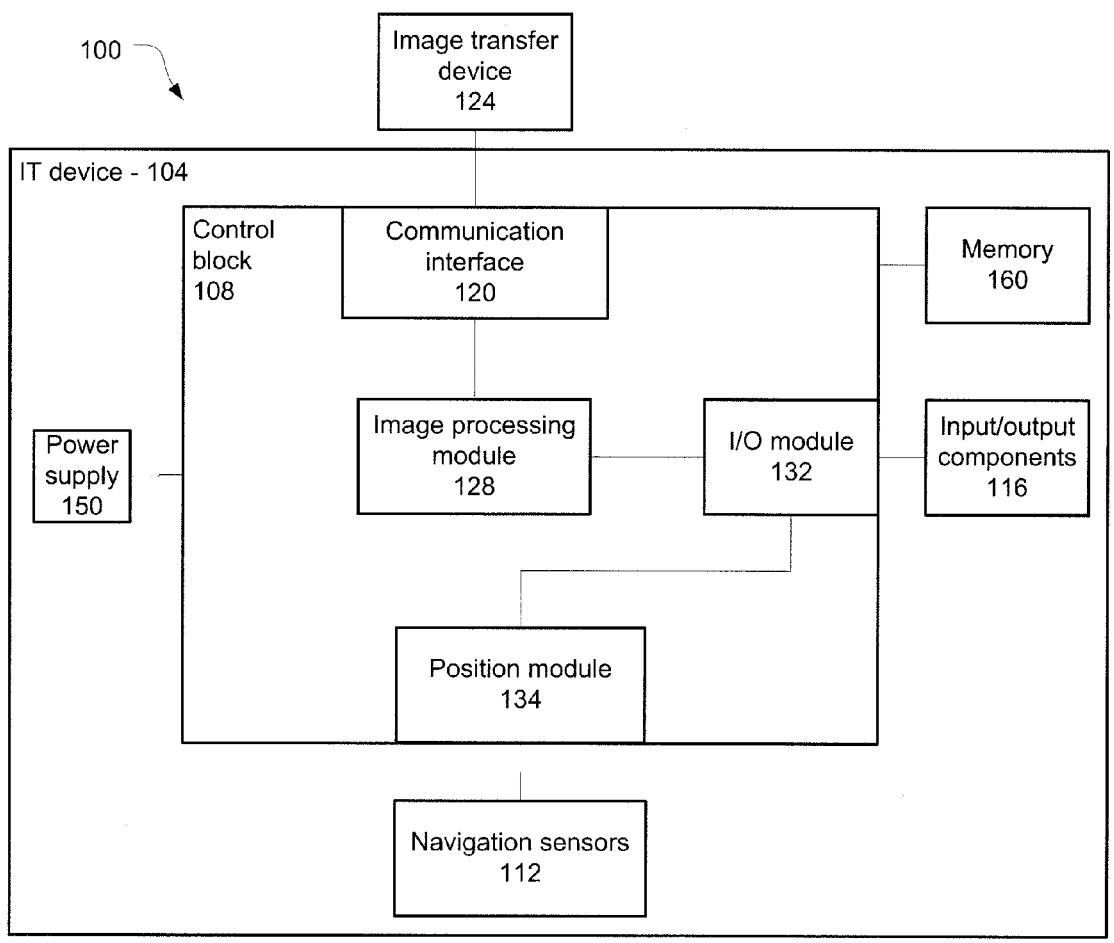
FIG. 1 illustrates a schematic of a system including a handheld image translation device in accordance with various embodiments of the present invention.

FIG. 1 is a schematic of a system 100 including a handheld image translation (IT) device 104 in accordance with various embodiments of the present invention. The IT device 104 may include a control block 108 with components designed to control one or more navigation sensors 112 in a manner to facilitate precise and accurate positioning of one or more input/output components 116 throughout an entire IT operation. This positioning may allow the IT device 104 to reliably translate an image in a truly mobile and versatile platform.

Image translation, as used herein, may refer to a translation of an image that exists in a particular context (e.g., medium) into an image in another context. For example, an IT operation may be a scan operation. In this situation, a target image, e.g., an image that exists on a tangible medium, is scanned by the IT device 104 and an acquired image that corresponds to the target image is created and stored in memory of the IT device 104. For another example, an IT operation may be a print operation. In this situation, an acquired image, e.g., an image as it exists in memory 160 of the IT device 104, may be printed onto a print medium.

The control block 108 may include a communication interface 120 configured to communicatively couple the control block 108 to an image transfer device 124. The image transfer device 124 may include any type of device capable of transmitting/receiving data related to an image involved in an IT operation. The image transfer device 124 may include a general purpose computing device, e.g., a desktop computing device, a laptop computing device, a mobile computing device, a personal digital assistant, a cellular phone, etc. or it may be a removable storage device, e.g., a flash memory data storage device, designed to store data such as image data. If the image transfer device 124 is a removable storage device, e.g., a universal serial bus (USB) storage device, the communication interface 120 may be coupled to a port, e.g., USB port, of the IT device 104 designed to receive the storage device.

The communication interface 120 may include a wireless transceiver to allow the communicative coupling with the image transfer device 124 to take place over a wireless link. The image data may be wirelessly transmitted over the link through the modulation of electromagnetic waves with frequencies in the radio, infrared, or microwave spectrums.

A wireless link may contribute to the mobility and versatility of the IT device 104. However, some embodiments may additionally/alternatively include a wired link communicatively coupling the image transfer device 124 to the communication interface 120.

In some embodiments, the communication interface 120 may communicate with the image transfer device 124 through one or more wired and/or wireless networks including, but not limited to, personal area networks, local area networks, wide area networks, metropolitan area networks, etc. The data transmission may be done in a manner compatible with any of a number of standards and/or specifications including, but not limited to, 802.11, 802.16, Bluetooth, Global System for Mobile Communications (GSM), code-division multiple access (CDMA), Ethernet, etc.

In an embodiment where an IT operation includes a print operation, the image transfer device 124 may transfer image data related to an image to be printed to the IT device 104 through the communication interface 120. The communication interface 120 may then transmit the received image data to an on-board image processing module 128. The image processing module 128 may process the received image data in a manner to facilitate an upcoming printing process. Image processing techniques may include dithering, decompression, half-toning, color plane separation, and/or image storage. In various embodiments some or all of these image processing operations may be performed by the image transfer device 124 or another device. The processed image may then be transmitted to an input/output (I/O) module 132, which may function as a print module in this embodiment, where it is cached in anticipation of the printing of the image.

In other embodiments, the processed image may be transmitted to memory 160. Memory 160 may include random access memory (RAM), dynamic RAM (DRAM), static RAM (SRAM), synchronous DRAM (SDRAM), dual-data rate RAM (DDRRAM), etc, the invention is not to be limited in this regard. Memory 160 may be coupled to the control block 108 and communicate directly or indirectly with every element therein.

The I/O module 132 may also receive positioning information, indicative of a position of a print head of the I/O components 116 relative to a reference location, from a position module 134. The position module 134 may control the navigation sensors 112 to track incremental movement of the IT device 104 relative to a reference location. In particular, the navigation sensors 112 may capture navigational measurements to facilitate this tracking. In some embodiments, the navigation sensors 112 may be imaging navigation sensors and may capture navigational images of an adjacent medium. In other embodiments, non-imaging navigation sensors may be used.

Once the I/O module 132 receives the positioning information it may map the location of the print head to a portion of the processed image with a corresponding location. The I/O module 132 may then control the print head in a manner to deposit a printing substance on a print medium adjacent to the IT device 104 to represent the corresponding portion of the processed image.

A print medium, as used herein, may be any type of medium on which a printing substance, e.g., ink, powder, etc., may be deposited. It is not limited to print paper or other thin, flexible print media commonly associated with traditional printing devices.

The print head may be an inkjet print head having a plurality of nozzles designed to deposit a printing substance, e.g., liquid ink droplets. The ink, which may be contained in reservoirs or cartridges, may be black and/or any of a number of various colors. A common, full-color inkjet print head may have nozzles for cyan, magenta, yellow, and black ink. The print head may include a linear array of nozzles for each color of ink. Other embodiments may utilize other printing techniques, e.g., toner-based printers such as laser or LED printers, solid ink printers, dye-sublimation printers, inkless printers, etc.

In an embodiment in which an IT operation includes a scanning operation, the I/O module 132 may function as an image capture module and may be communicatively coupled to one or more optical imaging sensors of the I/O components 116. Optical imaging sensors, which may include a number of individual sensor elements, may be designed to capture a plurality of surface images of a medium adjacent to the IT device 104. The surface images may be individually referred to as component surface images. The I/O module 132 may generate a composite image by stitching together the component surface images. The I/O module 132 may receive positioning information from the position module 134 to facilitate the arrangement of the component surface images into the composite image.

Relative to navigation sensors that are imaging navigational sensors, the optical imaging sensors may have a higher resolution, smaller pixel size, and/or higher light requirements. While the navigation sensors are configured to capture details about the structure of the underlying medium, the optical imaging sensors may be configured to capture an image of the surface of the medium itself.

In an embodiment in which the IT device 104 is capable of scanning full color images, the optical imaging sensors may have sensor elements designed to scan different colors.

A composite image acquired by the IT device 104 may be subsequently transmitted to the image transfer device 124 by, e.g., e-mail, fax, file transfer protocols, etc. The composite image may be additionally/alternatively stored locally by the IT device 104 in memory module 160, as an example, for subsequent review, transmittal, printing, etc. Prior to storage in memory module 160, image processing module 128 may perform various image processing techniques on the received image. Image processing techniques may include dithering, decompression, half-toning, and/or color plane separation.

In addition (or as an alternative) to composite image acquisition, an image capture module may be utilized for calibrating the position module 134. In various embodiments, the component surface images (whether individually, some group, or collectively as the composite image) may be compared to the processed print image rendered by the image processing module 128 to correct for accumulated positioning errors and/or to reorient the position module 134 in the event the position module 134 loses track of its reference point. This may occur, for example, if the IT device 104 is removed from the print medium during an IT operation.

The IT device 104 may include a power supply 150 coupled to the control block 108. The power supply 150 may be a mobile power supply, e.g., a battery, a rechargeable battery, a solar power source, etc. In other embodiments the power supply 150 may additionally/alternatively regulate power provided by another component (e.g., the image transfer device 124, a power cord coupled to an alternating current (AC) outlet, etc.).

Figure 2:
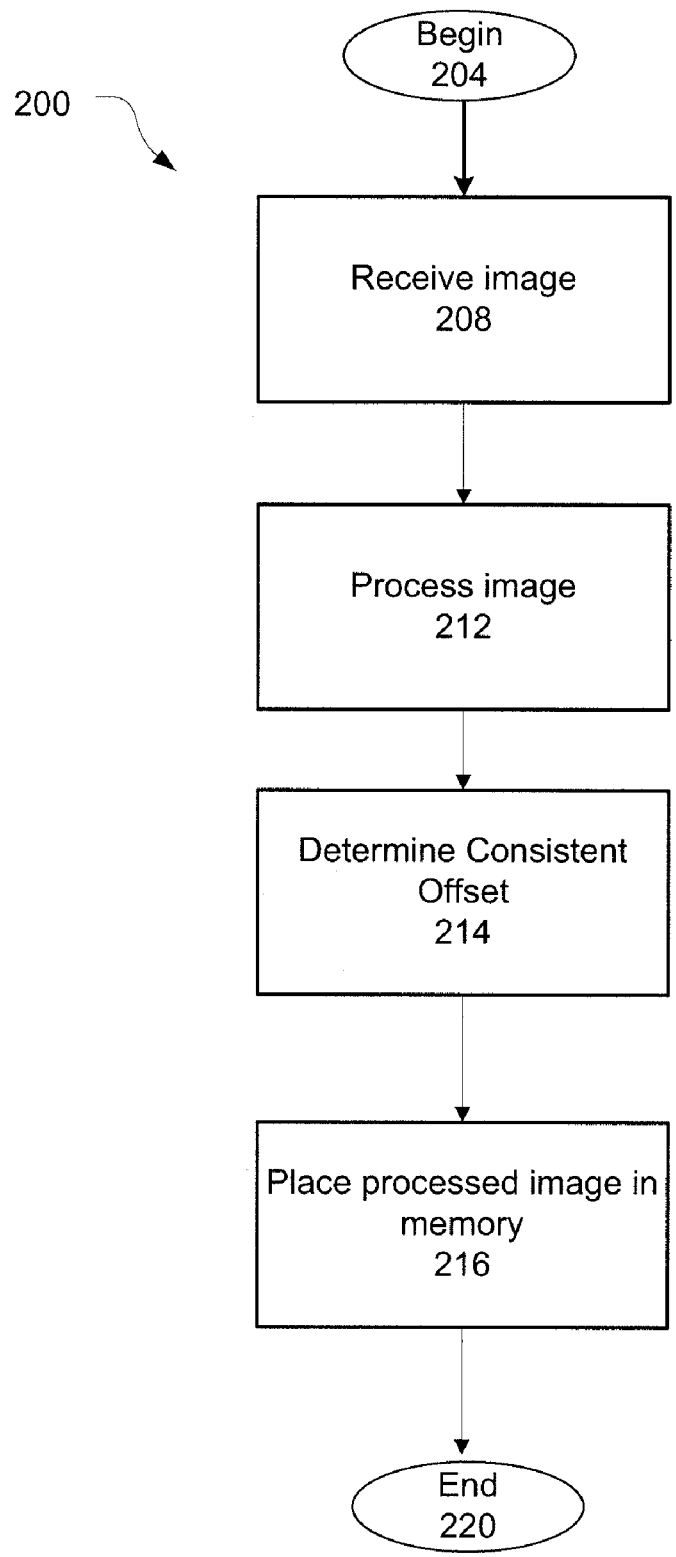
FIG. 2 illustrates a flow diagram depicting an image defining operation in a handheld image translation device in accordance with various embodiments of the present invention.

FIG. 2 is a flow diagram 200 depicting an image defining operation in an IT device, in accordance with various embodiments of the present invention. An image defining operation may begin in block 204 with an initiation of a scanning or printing operation. An image processing module may receive an image in block 208. The image may be received in preparation for a print function, or alternatively, the image may be received subsequent to a scan function. The image processing module 128 may receive the image from a communication interface or, in the event that an image previously received needs to be reprocessed, from storage and/or memory.

The image processing module 128 may process the image in block 212. Processing the image, in one embodiment, involves separating the received image into a plurality of color planes having a plurality of bits, i.e., color plane separation. Each of the color planes may include data translated or arranged in memory, e.g. a buffer, as a Cartesian (x-y) coordinate space. The color plane data may relate to the entire image or, in various embodiments, may relate to a calculated subset of the image. Furthermore, the color plane data for a subset of image may be determined based upon factors such as the current device position, current device velocity, current angular position of the device, device direction of motion, and physical print head column spacing. As these factors vary, the color plane data may also vary. Consequently, in various embodiments, additional position and velocity calculations or checks may take place to determine if the color plane data is accurate.

The received image may be divided into multiple color planes, including but not limited to cyan, magenta, yellow, and black. Image processing may include the separation of an image into more or fewer color planes of various colors. Each bit of a color plane may represent that color plane's portion of a pixel of the received image and may be associated with a bit in each of the other color planes. The associated bits from each of the color planes may cooperatively describe one pixel of the received image. Alternatively, more bits may be used to represent a pixel of the received image allowing for a more detailed representation of the pixel.

At block 214 the IT device may determine a consistent offset to be utilized in storing the plurality of color planes as a defined image in memory. The consistent offset may be determined based on memory capacity, the number of color planes, and/or the size of the received image. A consistent offset may be used to minimize calculations necessary to locate and retrieve bits from each of the individual color planes. For example, each bit of the plurality of bits for a color plane may be separated from its associated bits in each of the other color planes by the consistent offset. This may allow an IT device to locate one bit using various complex methods, and subsequently combine the memory address with an offset to locate the various other memory addresses. In various embodiments, the consistent offset may be determined before or after the image has been processed based on various characteristics of the received image. Still further, the consistent offset may be calculated by the image transfer device 124 and transmitted to the IT device along with the received image.

The IT device, at block 216, may place the processed image, e.g., the plurality of color planes in memory, e.g., a buffer, as a defined image. Each of the bits of an individual color plane may be stored in consecutive memory addresses as a dot array, which may be arranged as the image is to be printed, i.e., a plot of the memory space may show a monochrome, magnified version of the image. Additionally, the plurality of bits for a color plane may be separated from their associated bits in each of the other color planes by the consistent offset. In various embodiments, to facilitate storage, and utilization of the offset, each of the plurality of color planes may be stored in a memory address beginning at bit zero. Alternatively, however, the plurality of color planes may be stored in consecutive memory addresses which begin at various other bits within a memory address for more efficient usage of the memory capacity. Once the image is defined in memory, the method may end at block 220.

Figure 3:
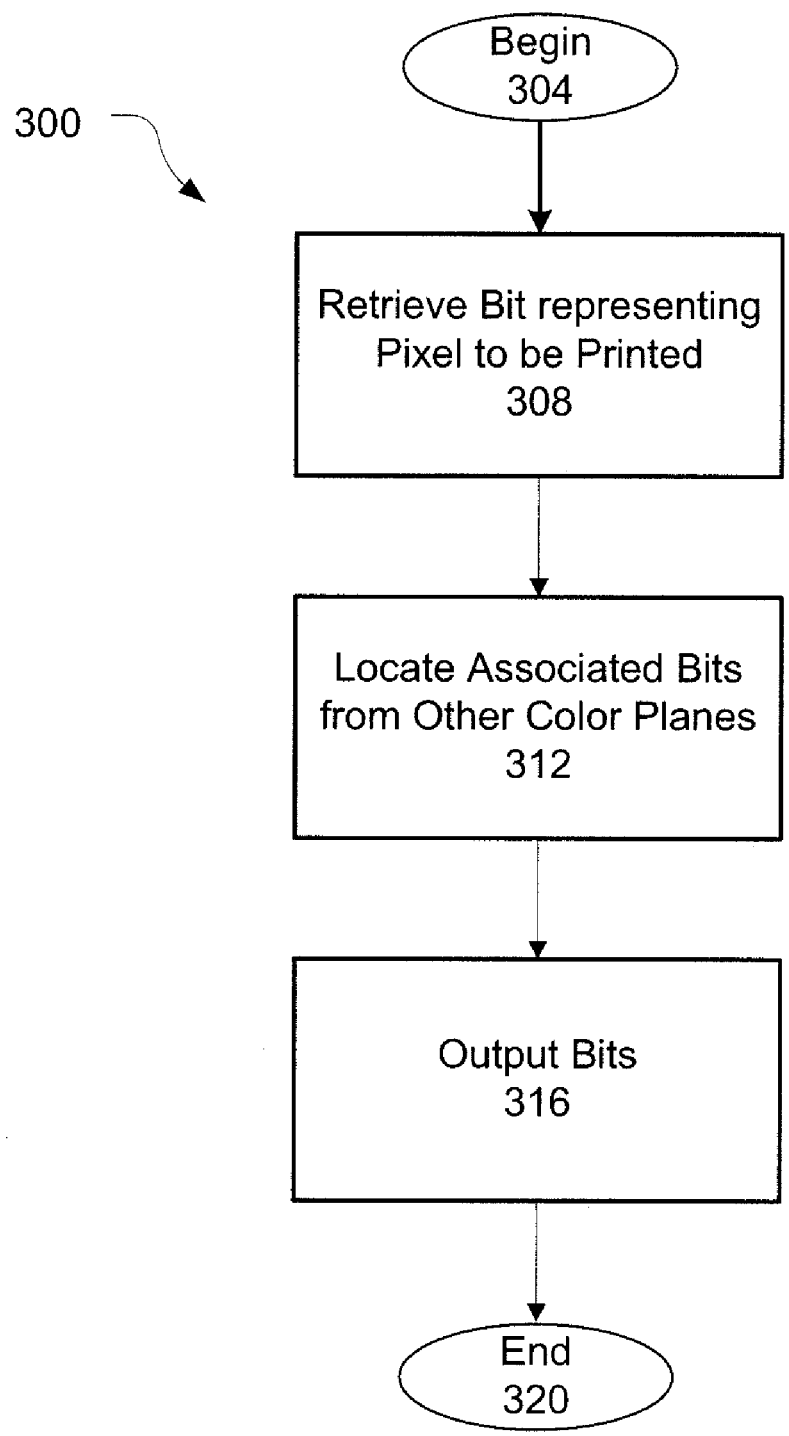
FIG. 3 illustrates a flow diagram depicting the retrieval operation of an image definition in a handheld image translation device in accordance with various embodiments of the present invention.

FIG. 3 illustrates a flow diagram depicting the retrieval operation of an image defined in memory, in accordance with various embodiments of the present invention. The method 300 may begin at block 304 with a request to output a defined image. At block 308, a print module may retrieve one of the plurality of bits stored in the memory module. The bit retrieved may correspond to a pixel which is to be output onto the print medium at a desired location. The bit may be accessed by determining the position of the IT device, with reference to the print medium, and by utilizing an algorithm to locate the appropriate memory address out of the consecutive memory addresses for each color plane. The bit to be retrieved may be associated with any of the plurality of color planes and located at any memory address.

Once the bit has been retrieved, the process may continue to block 312 where the IT device may locate the associated bits in each of the other color planes. In various embodiments, locating the associated bits may be done by utilizing the consistent offset and the memory address of the retrieved bit. Utilization of the consistent offset and the memory address of the retrieved bit may involve a plurality of algorithms and functions, including but not limited to, addition, subtraction, and multiplication functions.

At block 316, the IT device may output the associated bits which cooperatively describe the pixel. In some instances, various bits may not be output due to the position of the IT device. For example, the IT device portion which outputs a bit for a particular color plane may be located above an unassociated adjacent pixel. Therefore, in one embodiment, various ones of the associated bits may be dynamically cached for subsequent output based on an estimated direction of the IT device. Alternatively, the previously output bits may be rewritten to indicate their output while the remaining bits in memory are not rewritten and may be subsequently accessed and output. Thus, when data within the image plane buffer cannot be correctly placed during a pass of the print head, due to the angle/position of the print head not aligning properly with the locations of the print medium, it may be placed on a subsequent pass. The method may then end at block 320.

Figure 4:
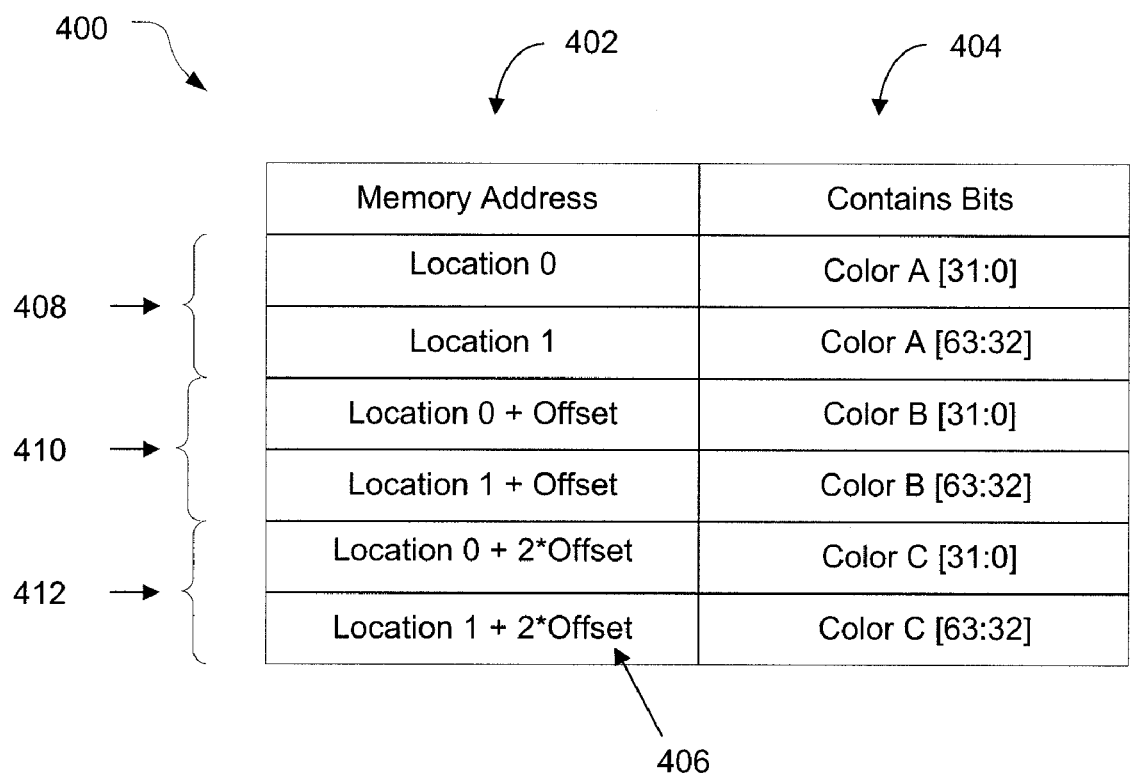
FIG. 4 illustrates a table representation of memory addresses and their corresponding bits in accordance with various embodiments of the present invention.

FIG. 4 in accordance with various embodiments of the present invention, illustrates a table representation of a memory 400 having an image defined therein. In various embodiments, the image may be a portion of a subset of a larger image. Memory address column 402 illustrates an embodiment of the consecutive memory addresses used for each of the color planes 408, 410, and 412. The memory locations for each of the plurality of color planes may begin at address location 0 and be further defined with reference to a consistent offset, e.g., beginning at location 0, plus an offset 406. Column 404 contains the consecutive bits of each of the plurality of color planes. In the illustrated embodiment, each color plane includes 64 bits. Color planes may include more or fewer bits.

Memory 400, in the illustrated embodiment, has a defined image including three color planes, A, B, and C. For each of the bits in color plane A, there are associated bits in color planes B and C. In various embodiments the bits may represent whether ink is to be put down on the print medium. As an example, bit 15 of Color plane A may indicate color A is needed. Associated bits 15 of color planes B, and C, may indicate the colors are not needed, and consequently, the pixel may comprise only ink associated with color plane A.

In this embodiment, it may be noted that the consistent offset is 64 bits. However, in other embodiments, the consistent offset may be larger or smaller. The consistent offset may also be utilized in various manners. For instance, the consistent offset may be used in combination with the most recently accessed memory location, causing the consistent offset to remain at 64 bits, or alternatively, always with reference to a base location in which case the consistent offset may be a multiple of 64 bits for each subsequent color plane.

Figure 5:
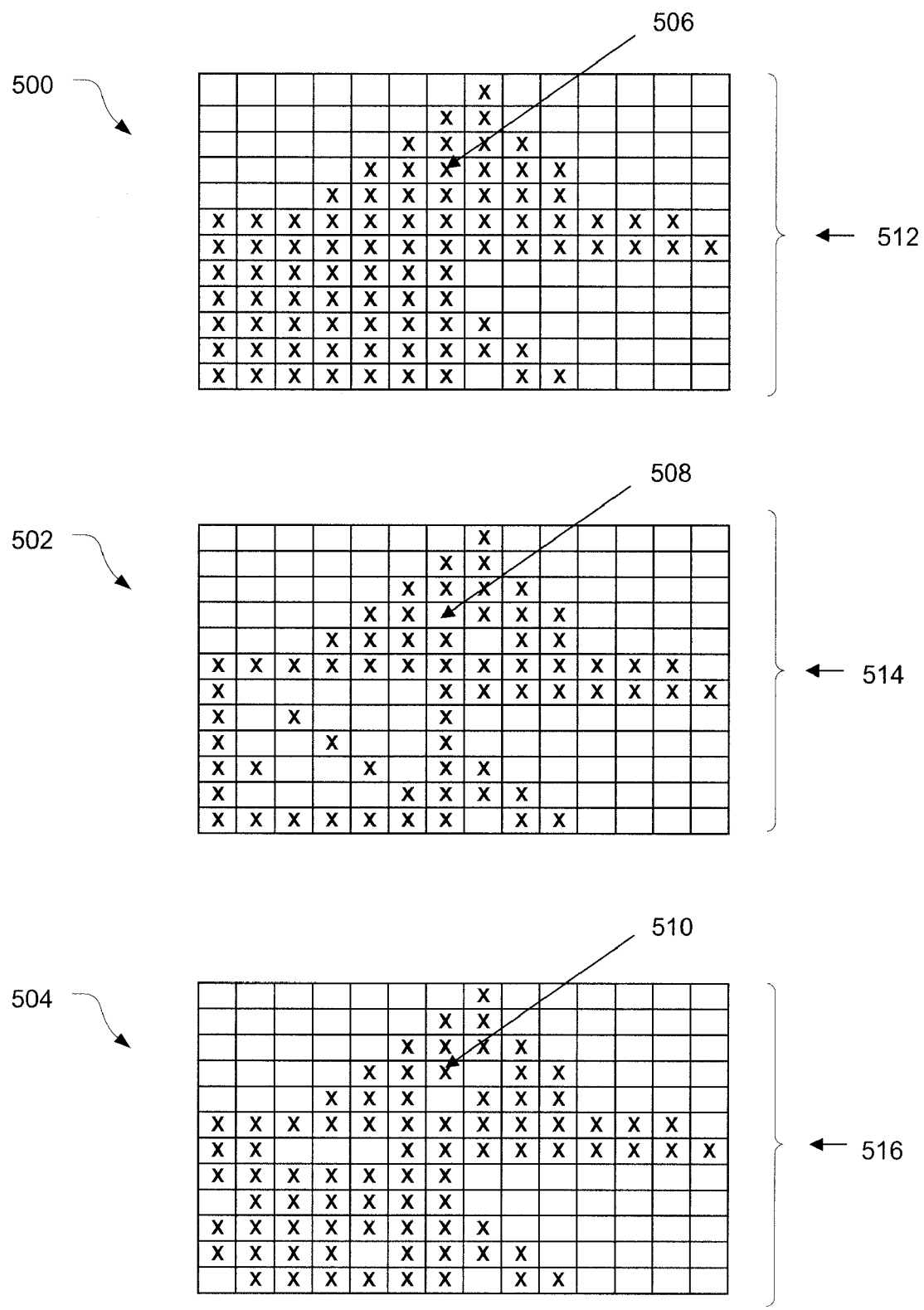
FIG. 5 illustrates a diagram of a plurality of color planes as defined in memory in accordance with various embodiments of the present invention.

FIG. 5 illustrates a diagram of the plurality of color planes as defined in memory, in accordance with various embodiments of the present invention. In the illustrated embodiment, the memory module includes three color planes 500, 502, and 504. The color planes may include a plurality of bits which are designated as either an "x" or a blank for illustrative purposes. The plurality of bits are stored in consecutive memory addresses 512, 514, and 516, as a dot array arranged as they are to be printed. Consecutive memory addresses 512, 514, and 516 may be separated by a consistent offset. Furthermore, each bit may have an associated bit in each of the other color planes. For example, bit 506 in color plane 500 may have associated bits 508 and 510 in color planes 502 and 504, respectively. All of the associated bits may be located by utilizing the consistent offset and the memory address of any one of the associated bits.

In the illustrated embodiment, bit 506 indicates that color plane 500 contributes ink to the corresponding pixel, bit 508 indicates that color plane 502 does not contribute ink to the corresponding pixel, and bit 510 indicates that color plane 504 contributes ink to the corresponding pixel. Consequently, only bits 506 and 510 from color planes 500 and 504, respectively, are needed to describe the corresponding pixel. Each associated bit of a color plane may be placed on a print medium in accordance with the limitations of the IT device, e.g., the IT device's dots per inch resolution.

Figure 6:
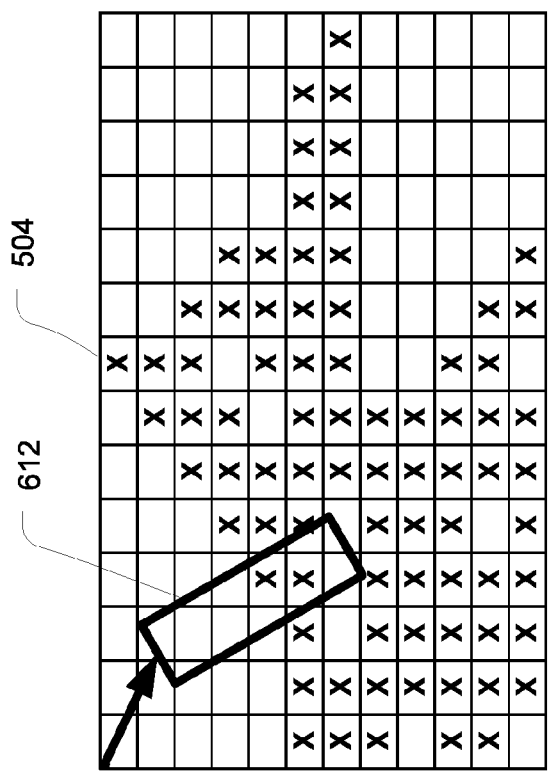
FIG. 6 is a graphic depiction of a bit selection operation in accordance with various embodiments of the present invention.
Figure 6:
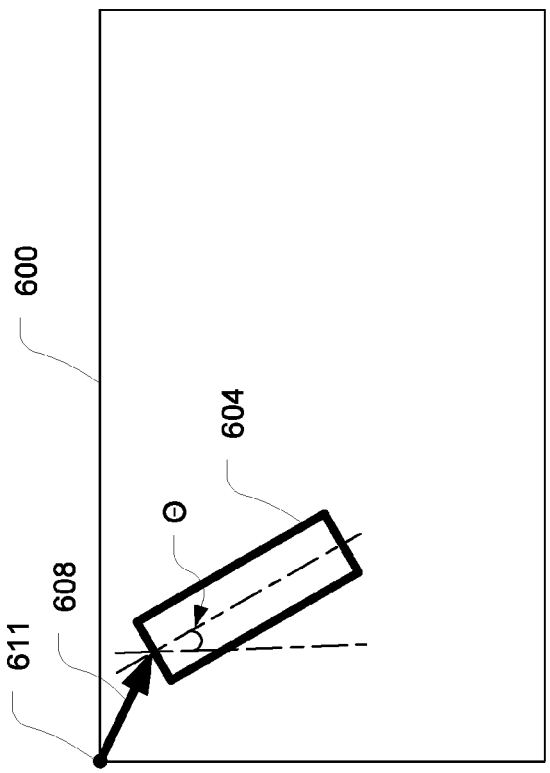

FIG. 6 is a graphic depiction of a bit selection operation in accordance with various embodiments of the present invention. A print medium 600 is shown with an overlay of a print head and, in particular, a nozzle row 604 of the print head. The nozzle row 604 may have a plurality of nozzles configured to deposit a first color. A position module within an IT device having the print head may determine the translation 608 and rotation Θ of the nozzle row 604 with respect to a reference location, e.g., reference location 611. The translation 608 and rotation Θ may be used to determine the physical location of the nozzle row 604 on the print medium 600.

The print module may determine which bits correspond to the determined location of the nozzle row 604 by developing a memory overlay 612 having the same physical dimensions of the nozzle row 604. The memory overlay 612 may be mapped to a corresponding color plane, e.g., color plane 504, using the determined location information of the nozzle row 604. Bits from memory locations of the color plane 504 that overlap the memory overlay 612 by more than a certain threshold, e.g., 50%, may be selected.

The memory locations may be ordered with the rows, or "addresses," and columns, or "bit locations," beginning at 0 and incrementing down and across the page, respectively. In this embodiment, the selected bits may be from the following memory locations: address 1, bit location 2; address 2, bit location 2; address 3, bit locations 2 and 3; address 4, bit location 3; address 5, bit location 3; and address 6, bit location 3. Of the selected memory locations, only two include bits that indicate ink should be contributed, e.g., address 4, bit 3 and address 5, bit 3. Accordingly, a print module may control the nozzles of the nozzle row 604 that correspond to these memory locations to deposit ink.

A similar nozzle row overlay and bit selection operation may be done for each of the colored nozzle rows with respect to their corresponding color planes. Furthermore, and in accordance with some embodiments, a consistent offset may be used to select bits associated with the selected bits of color plane 504. It may be noted that the consistent offset may account for device velocity, device direction of travel, and the different physical location of the nozzle columns located on the print head.

The above embodiment discusses a bit selection operation by mapping a location of the nozzle row to the appropriate memory locations having bits of a color plane. In some embodiments, the locations of individual nozzles of a particular nozzle row may be mapped to corresponding memory locations. Mapping an individual nozzle location to a corresponding memory location may be a subset of the mapping of the nozzle row location to a group of corresponding memory locations.

Figure 7:
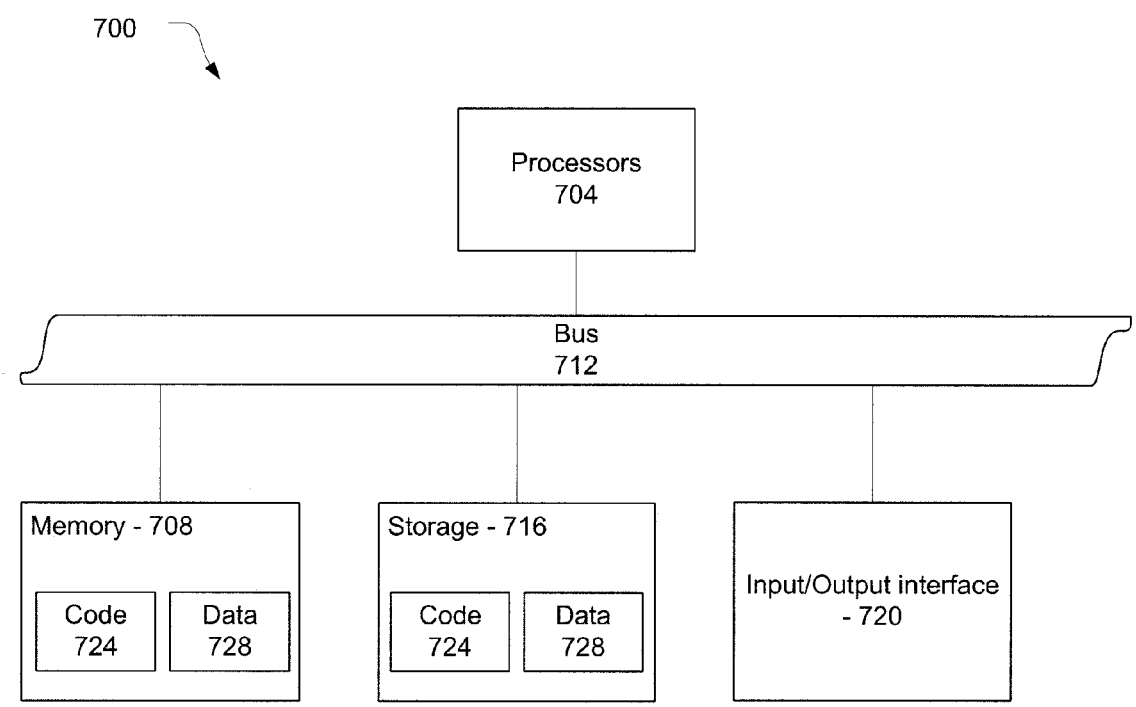
FIG. 7 illustrates a computing device capable of implementing a control block of a handheld image translation device in accordance with various embodiments of the present invention.

FIG. 7 illustrates a computing device 700 capable of implementing a control block, e.g., control block 108, in accordance with various embodiments. As illustrated, for the embodiments, computing device 700 includes one or more processors 704, memory 708, and bus 712, coupled to each other as shown. Additionally, computing device 700 includes storage 716, and one or more input/output interfaces 720 coupled to each other, and the earlier described elements as shown. The components of the computing device 700 may be designed to provide the various functions of a control block of an IT device as described herein.

Memory 708 and storage 716 may include, in particular, temporal and persistent copies of code 724 and data 728, respectively. The code 724 may include instructions that when accessed by the processors 704 result in the computing device 700 performing operations as described in conjunction with various modules of the control block in accordance with embodiments of this invention. The processing data 728 may include data to be acted upon by the instructions of the code 724. In particular, the accessing of the code 724 and data 728 by the processors 704 may facilitate image translation and/or positioning operations as described herein.

The processors 704 may include one or more single-core processors, multiple-core processors, controllers, application-specific integrated circuits (ASICs), etc.

The memory 708 may include random access memory (RAM), dynamic RAM (DRAM), static RAM (SRAM), synchronous DRAM (SDRAM), dual-data rate RAM (DDRRAM), etc.

The storage 716 may include integrated and/or peripheral storage devices, such as, but not limited to, disks and associated drives (e.g., magnetic, optical), USB storage devices and associated ports, flash memory, read-only memory (ROM), non-volatile semiconductor devices, etc. Storage 616 may be a storage resource physically part of the computing device 700 or it may be accessible by, but not necessarily a part of, the computing device 600. For example, the storage 716 may be accessed by the computing device 700 over a network.

The I/O interfaces 720 may include interfaces designed to communicate with peripheral hardware, e.g., I/O components 116, navigation sensors 112, etc., and/or remote devices, e.g., image transfer device 124.

In various embodiments, computing device 700 may have more or less elements and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
    determining a position of a handheld image translation device with respect to a print medium;
    based upon the determined position of the handheld image translation device with respect to the print medium, determining (i) a location of a first nozzle row of the handheld image translation device relative to a reference location and (ii) a location of a second nozzle row of the image translation device relative to the reference location, wherein the first nozzle row comprises a first plurality of nozzles, wherein the first plurality of nozzles is configured to deposit printing substance of a first color on the print medium, wherein the second nozzle row comprises a second plurality of nozzles, and wherein the second plurality of nozzles is configured to deposit printing substance of a second color on the print medium;
    mapping (i) the location of the first nozzle row to a first two or more memory locations within a first plurality of memory locations that have a respective first plurality of bits representing a first color plane of a print image and (ii) the location of the second nozzle row to a second two or more memory locations within a second plurality of memory locations that have a respective second plurality of bits representing a second color plane of the print image, wherein the first color plane corresponds to the first color, and wherein the second color plane corresponds to the second color;
    selecting (i) a first two or more bits from the first two or more memory locations (ii) and a second two or more bits from the second two or more memory locations; and
    controlling (i) the first nozzle row to deposit the printing substance of the first color on the print medium based at least in part on the selected first two or more bits from the two or more memory locations and (ii) the second nozzle row to deposit the printing substance of the second color on the print medium based at least in part on the selected second two or more bits from the second two or more memory locations,
    wherein mapping the location of the first nozzle row to the first two or more memory locations comprises
        generating a memory overlay based at least in part on dimensions of the first nozzle row,
        mapping the memory overlay to the first plurality of memory locations based at least in part on the determined location of the first nozzle row, and
        determining that each of the first two or more memory locations of the first plurality of memory locations overlaps the memory overlay by greater than a threshold value.

2. The method of claim 1, wherein the selected first two or more bits are associated with the selected second two or more bits.

3. A machine-accessible, non-transitory medium having associated instructions, which, when accessed, results in a machine:
    determining a position of a handheld image translation device with respect to a print medium;
    based upon the determined position of the handheld image translation device with respect to the print medium, determining a location of a nozzle row of the image translation device relative to a reference location, wherein the nozzle row comprises a plurality of nozzles configured to deposit printing substance of a first color on the print medium, mapping the location of the nozzle row to two or more memory locations within a plurality of memory locations that have a respective plurality of bits representing a color plane of a print image;

selecting two or more bits from the two or more memory locations; and controlling the nozzle row to deposit the printing substance on the print medium based at least in part on the selected two or more bits, wherein mapping the location of the nozzle row to the two or more memory locations comprises generating a memory overlay based at least in part on dimensions of the nozzle row, mapping the memory overlay to the plurality of memory locations based at least in part on the determined location of the nozzle row, and determining that each of the two or more memory locations of the plurality of memory locations overlaps the memory overlay by greater than a threshold value.

4. An apparatus comprising:

means for determining (i) a position of a handheld image translation device with respect to a print medium, (ii) a location of a first nozzle row of the image translation device relative to a reference location based upon the determined position of the handheld image translation device with respect to the print medium, and (iii) a location of a second nozzle row of the image translation device relative to the reference location based upon the position of the handheld image translation device, wherein the first nozzle comprises a first plurality of nozzles configured to deposit printing substance of a first color on the print medium, and wherein the second nozzle comprises a second plurality of nozzles configured to deposit printing substance of a second color on the print medium;

means for mapping (i) the location of the first nozzle row to a first two or more memory locations within a first plurality of memory locations that have a respective first plurality of bits representing a first color plane of a print image, and (ii) the location of the second nozzle row to a second two or more memory locations within a second plurality of memory locations that have a respective second plurality of bits representing a second color plane of the print image, wherein the first color plane corresponds to the first color, and wherein the second color plane corresponds to the second color;

means for selecting (i) a first two or more bits from the first two or more memory locations, and (ii) a second two or more bits from the second two or more memory locations; and means for controlling (i) the first nozzle row to deposit the printing substance of the first color on the print medium based at least in part on the selected first two or more bits from the first two or more memory locations and (ii) the second nozzle row to deposit the printing substance of the second color on the print medium based at least in part on the selected second two or more bits from the second two or more memory locations, wherein means for mapping the location of the first nozzle row to the first two or more memory locations comprises means for generating a memory overlay based at least in part on dimensions of the first nozzle row, means for mapping the memory overlay to the first plurality of memory locations based at least in part on the determined location of the first nozzle row, and means for determining that each of the first two or more memory locations of the first plurality of memory locations overlaps the memory overlay by greater than a threshold value.

5. The apparatus of claim 4, wherein the selected first two or more bits are associated with the selected second two or more bits.

6. The apparatus of claim 4, further comprising:

means for determining an association between the selected first two or more bits and the selected second two or more bits.

* * * * *